United States Patent
Watanabe et al.

(10) Patent No.: US 10,502,943 B2
(45) Date of Patent: Dec. 10, 2019

(54) MICROSCOPE SYSTEM AND AUTOFOCUSING METHOD

(71) Applicant: SONY CORPORATION, Tokyo (JP)

(72) Inventors: Shinji Watanabe, Tokyo (JP); Kazuki Aisaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 91 days.

(21) Appl. No.: 14/903,120

(22) PCT Filed: Oct. 29, 2014

(86) PCT No.: PCT/JP2014/005459
§ 371 (c)(1),
(2) Date: Jan. 6, 2016

(87) PCT Pub. No.: WO2015/068360
PCT Pub. Date: May 14, 2015

(65) Prior Publication Data
US 2016/0246045 A1    Aug. 25, 2016

(30) Foreign Application Priority Data
Nov. 7, 2013  (JP) ................ 2013-230998

(51) Int. Cl.
G02B 21/00 (2006.01)
G02B 21/12 (2006.01)
G02B 21/16 (2006.01)
G02B 21/36 (2006.01)
G02B 21/24 (2006.01)

(52) U.S. Cl.
CPC ....... *G02B 21/244* (2013.01); *G02B 21/0076* (2013.01); *G02B 21/0084* (2013.01); *G02B 21/12* (2013.01); *G02B 21/16* (2013.01); *G02B 21/367* (2013.01)

(58) Field of Classification Search
CPC .............. G02B 21/367; G02B 21/0076; G02B 21/0084; G02B 21/12; G02B 21/16; G02B 21/244
USPC ......................................................... 348/79
See application file for complete search history.

(56) References Cited

U.S. PATENT DOCUMENTS

| | | | | |
|---|---|---|---|---|
| 4,031,391 A | * | 6/1977 | Hoppe | H01J 37/22 250/311 |
| 9,128,296 B2 | * | 9/2015 | Steinborn | G02B 21/241 |
| 2009/0086314 A1 | * | 4/2009 | Namba | G01N 21/6458 359/383 |
| 2009/0159814 A1 | * | 6/2009 | Maiya | G02B 21/16 250/458.1 |

(Continued)

FOREIGN PATENT DOCUMENTS

| | | | |
|---|---|---|---|
| JP | 2013044967 A | * | 3/2013 |
| JP | 2013050667 A | * | 3/2013 |

*Primary Examiner* — Christopher S Kelley
*Assistant Examiner* — Kathleen M Walsh
(74) *Attorney, Agent, or Firm* — Chip Law Group

(57) ABSTRACT

An imaging system, comprising a controller configured to control the imaging system to: capture a first image of a sample, the first image being one of a bright field image, a phase difference image, and a differential interference image; and capture, based at least in part on information obtained from the first image, a second image of the sample, the second image being a different type of image than the first image.

12 Claims, 9 Drawing Sheets

(56) References Cited

U.S. PATENT DOCUMENTS

| | | | |
|---|---|---|---|
| 2009/0212242 A1* | 8/2009 | Yamada | G01N 21/6458 250/580 |
| 2009/0226061 A1* | 9/2009 | Maiya | G02B 21/367 382/128 |
| 2009/0274360 A1* | 11/2009 | Suzuki | G01N 21/6428 382/133 |
| 2010/0103254 A1* | 4/2010 | Okamoto | G02B 21/0088 348/79 |
| 2012/0069171 A1* | 3/2012 | Kodaira | G02B 21/365 348/79 |
| 2012/0098950 A1* | 4/2012 | Zheng | G02B 21/06 348/79 |
| 2012/0223217 A1* | 9/2012 | Zheng | B01L 3/508 250/215 |
| 2014/0087463 A1* | 3/2014 | Gautam | C12N 5/0602 435/375 |
| 2014/0192178 A1* | 7/2014 | Huang | G02B 21/14 348/79 |

* cited by examiner

MICROSCOPE SYSTEM AND AUTOFOCUSING METHOD

CROSS REFERENCE TO RELATED APPLICATIONS

This application claims the benefit of Japanese Priority Patent Application JP 2013-230998 filed Nov. 7, 2013, the entire contents of which are incorporated herein by reference.

TECHNICAL FIELD

The present technology related to a microscope system and an autofocusing method thereof.

BACKGROUND ART

In recent years, a biological observation apparatus capable of observing the distribution of a fluorescent material in a sample and obtaining data of the fluorescent material as data of a sharp and highly quantitative image has been disclosed (see, for example, Patent literature 1). The biological observation apparatus obtains a bright field image and a fluorescent image, and combines the images.

In addition, in recent years, a method (global motion vector estimation, GME) that calculates movement (global motion vector, GMV) of the entire images, each of which includes an object has been disclosed (see, for example Patent Literature 2).

CITATION LIST

Patent Literature

[PTL 1]
Japanese Patent Application Laid-open No. 2009-17566
[PTL 2]
Japanese Patent Application Laid-open No. 2009-065332

SUMMARY

Technical Problem

In the biological observation apparatus disclosed in Patent Literature 1, focusing is performed manually, and a bright field image and a fluorescent image are captured. However, the capturing and the autofocusing (AF) function, have not been improved by providing feedback of the information obtained from the images.

As described above, in the capturing by the existing microscope, the autofocusing function that is important to automate the microscope capturing is insufficient many respects.

In view of the circumstances as described above, it is desirable to provide a microscope system having an appropriate autofocusing function, and a focusing method thereof.

Solution to Problem

According to an embodiment of the present technology, there is provided a microscope system including a stage on which a fluorescence-stained biological sample is placed, the stage being movable, a bright field image capturing unit configured to capture a bright field image of the biological sample placed on the stage, a fluorescent image capturing unit configured to capture a fluorescent image of the biological sample placed on the stage, and a controller configured to cause the bright field image capturing unit to capture the bright field image at different times, to calculate movement between the bright field image currently captured and the bright field image captured at the previous time for each capturing of the bright field image, to move the stage so that the movement is canceled out and to cause the fluorescent image capturing unit to capture the fluorescent image.

In the microscope system according to the embodiment of the present technology, the controller may be configured to repeat the process including capturing the bright field image, calculating the movement, moving the stage, and capturing the fluorescent image.

The microscope system according to the embodiment of the present technology may further include an objective lens used for the capturing, the controller being configured to set, as a detection frame, an area in an XY plane perpendicular to an optical axis of the objective lens used to search for a focal position of the objective lens, to set a region of interest (ROI) area in the fluorescent image, to calculate movement of the ROI area based on a plurality of fluorescent images captured sequentially, and to move the detection, frame is the XY plane based on the movement of the ROI area.

The microscope system according to the embodiment of the present technology may further include a temperature sensor configured to measure a temperature of the stage, and a storage unit configured to store information on a relationship between the temperature of the stage and distortion of the stage in the optical axis in advance, the controller being configured to obtain the temperature of the stage from the temperature sensor, and to refer to the relationship information to set a range of the optical axis for searching for the focal position based on the obtained temperature.

In the microscope system according to the embodiment of the present technology, the controller may be configured to calculate a time period necessary for moving the stage so that the movement between the bright field images is canceled out, and to cancel the movement of the stage and cause the storage unit to store the movement between the bright field images in a case where the calculated time period is longer than a time period for capturing the bright field image.

According to an embodiment of the present technology, there is provided an autofocusing method, including capturing, by a bright field image capturing unit, a blight field image of a fluorescence-stained biological sample at different times, the biological sample being placed on a movable stage, calculating, by a controller, movement between, the bright field images captured at respective times, and moving, by the controller, the stage so that the movement is canceled out, and capturing, by a fluorescent image capturing unit, a fluorescent image of the biological sample after the movement of the stage.

Advantageous Effects of Invention

As described above, according to the present technology, it is possible to achieve an appropriate autofocusing function.

It should be noted that the effects described above are not necessarily restrictive, and may be any of those described in the present technology.

DESCRIPTION OF EMBODIMENTS

Hereinafter, embodiments according to the present technology will be described with reference to the drawings.

First Embodiment

In this embodiment, a configuration in the case where an autofocusing method according to an embodiment of the present technology, more specifically, a method of setting a range of detection for autofocusing is applied to a laser scanning microscope system will be described. It should be noted that the application of the embodiment of the present technology is not limited to the laser scanning microscope.
(Background)

A method of observing a cell using a microscope, which is called lime lapse observation, takes a lot of time to capture an image. When capturing an image for a long time with autofocusing, deviation of an autofocusing target range (detection frame) or defocusing is caused.

For example, the deviation of a detection frame is caused due to drift, time degradation of a cell (individual movement of cells), or the like. By the deviation, an object, which is an observation target of an observer, is out of the detection frame. If the object is out of the detection frame, it may be impossible to perform appropriate autofocusing. On the other hand, defocusing is caused due to, for example, distortion of a microscope caused by a temperature change.

It should be noted that the term "drift" represents that an object in a captured image is displaced in the same direction in the ease where a sample being an observation target is a dish for cell culture or is observed in vivo. The "individual movement of cells" represents independent movement of individual cells.

The "deviation of a detection frame" represents deviation in XY directions assuming that directions perpendicular to an optical axis of an objective lens of a microscope are XY directions and the direction of the optical axis is Z direction. On the other hand, the "defocusing" represents deviation in a Z direction.

According to the present technology, the drift and individual movement of cells caused by elapse of time and various types of deviation caused due to distortion caused by a temperature change are corrected, and a range of detection for autofocusing is appropriately set.

It should be noted that as an autofocusing method for focusing itself e.g., a contrast autofocusing method and a phase difference autofocusing method, a well-known method is used.
(Configuration of Microscope System)

Figure 1:
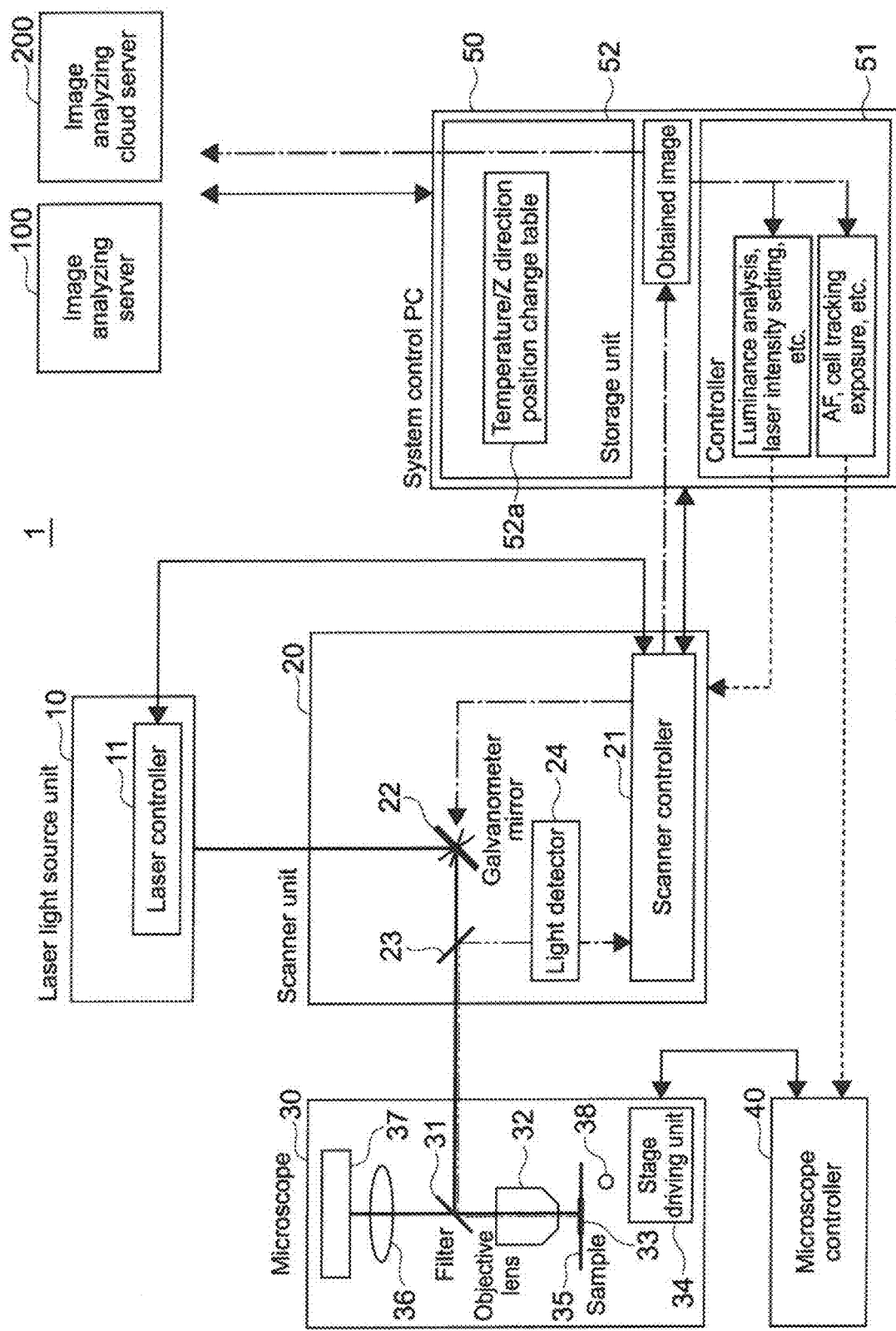
FIG. 1 is a configuration diagram of a laser scanning microscope system using an embodiment of the present technology.

As described above, in the first embodiment, a configuration in which an embodiment of the present technology is used for a laser scanning microscope system is described. FIG. 1 is a configuration diagram of a laser scanning microscope system using an embodiment of the present technology.

The microscope system 1 includes a laser light source unit 10, a scanner unit 20, a microscope 30, a microscope controller 40, and a system control PC 50. It should be noted that processes such as an image analyzing process performed in the system control PC 50 may be performed by an image analyzing server 100 on a local network or by an image analyzing cloud server 200 on the Internet cloud.

The laser light source unit 10 generates excitation light for causing a fluorescent-labelled sample such as a cell to generate fluorescent light. The generated excitation light is introduced into the scanner unit 20.

The laser light source unit 10 includes a laser controller 11. The laser controller 11 controls the intensity of excitation light, the light emission interval, and the like.

The scanner unit 20 includes a scanner controller 21, a galvanometer mirror 22, a dichroic mirror 23, and a light detector 24 (fluorescent image capturing unit).

The galvanometer mirror 22 changes the direction of laser light for excitation in an X direction and a Y direction so that the laser light for excitation introduced from the laser light source unit 10 is moved hi the horizontal direction (XY directions) of a sample placed on a stage 35 of the microscope 30 and is applied. The laser light whose direction is adjusted by the galvanometer mirror 22 is transmitted through the dichroic mirror 23, and then introduced into the microscope 30. The laser light introduced into the microscope 30 is applied to the sample. The fluorescent light excited by the irradiation returns from the microscope 30 to the scanner unit 20.

The dichroic mirror 23 reflects, toward the light detector 24, only the fluorescent light out of the laser light and fluorescent light returned from the microscope 30.

As the light detector 24, in general, a photomultiplier tube (PMT) is used. The light detector 24 detects fluorescent light excited in a sample irradiated with laser light. It should be noted that in the case of a confocal microscope, a pinhole is placed in front of the light detector 24 on a light path. The pinhole is placed at a conjugated position with a focal position of an objective lens 32 to be described later.

The scanner controller 21 controls the galvanometer mirror 22 or the light detector 24 in order to scan a sample in XY directions. A signal detected by the light detector 24 is transmitted to the system control PC 50 as a luminance value for each scanned point on the XY plane.

The microscope 30 includes a filter 31, the objective lens 32, the stage 35, a stage driving unit 34, an imaging lens 36, an imaging unit 37 (bright field image capturing unit), and a temperature sensor 38. It should be noted that on the stage 35, a sample to be observed is placed.

The filter 31 guides the laser light, which is introduced from the scanner unit 20, into the objective lens 32. In addition, the filter 31 guides fluorescent light, which is generated from a sample by laser irradiation, into the scanner unit 20, or light reflected from or transmitted through a sample, which is applied from a bright field light source (not shown), into the imaging lens 36.

The objective lens 32 collects laser light, which is introduced through the filter 31 from the scanner unit 20, at a focal position of the objective lens 32. In addition, the objective lens 32 guides fluorescent light, which is generated from a sample, into the scanner unit 20 through the filter 31, or guides light, which is applied to a sample from the bright field light source, into the imaging lens 36 through the filter 31.

On the stage 35, a sample is placed. The stage 35 is moved in XY directions perpendicular to the optical axis of the objective len 32 and Z direction along the optical axis of the objective lens 32 by the stage driving unit 34.

The imaging lens 36 pauses bright field light, which has been transmitted through the objective lens 32 and the filter 31, to be formed on an image sensor (not shown) of the imaging unit 37.

The imaging unit 37 captures at bright field image formed on the images sensor by the imaging lens 36. The captured image is transmitted to the system, control PC 50 and is analyzed.

The temperature sensor 38 measures the temperature in the microscope 30, and transmits the measured value to the system control PC 50. The temperature sensor 38 may be placed at any position in the microscope 30 as long as a temperature change, which causes defocusing in a Z direction, can be detected.

The microscope controller 40 causes the stage driving unit 34 to move the stage 35 based on an instruction about autofocusing, cell tracking exposure, or the like from the system control PC 50, particularly, instruction to correct the drift, the individual movement of cells, and deviation caused due to a temperature change.

The system control PC 50 includes a controller 51 and a storage unit 52.

The controller 31 controls the entire microscope system 1, generates a fluorescent image by combining images using a luminance value detected by the light detector 24 and a coordinate pair value of the detected luminance value on the XY plane, calculates an optimal intensity of laser light by analyzing the combined fluorescent image, and controls, the intensity of laser light. In addition, as described above, the controller 51 controls the microscope controller 40, and achieves the functions of the microscope 30 such as autofocusing and cell tracking exposure.

In addition, the controller 51 calculates the movement of drift as GMV by a method such as GME, calculates the individual movement of cells, and determines the defocusing in a Z direction based on the temperature measured in the microscope 30. The controller 51 instructs the microscope controller 40 to correct the calculated deviation. It should be noted that a program stored in the storage unit 52 is executed by a central processing unit (CPU), and thus the controller 51 is realized.

The storage unit 52 is constituted of a hard disk drive or a semiconductor memory. In the storage unit 52, a group of the programs executed by the CPU, a fluorescent image obtained from the scanner unit 20, a temperature/Z direction position change table 52*a* (related information), and the like are stored. The temperature/Z direction position change table 52*a* stored in the storage unit 52 is obtained by measuring a relationship between the temperature in the microscope 30 and the positions change of the stage 35 in a Z direction (defocusing) in advance.

The schematic configuration of the microscope system 1 has been described above.

(Overview of Countermeasures Against Deviation)
(Countermeasures Against Drift)

In this embodiment, an observer desires to finally observe a fluorescent image. However, because it is difficult to detect drift only from a fluorescent image, a bright field image is used to detect drift appropriately.

Because drift is movement of the entire cell group, the cell group is focused first and a bright field image is captured. Based on the bright field images GMV, i.e., the movement of the drift of the entire cell group is detected using a method such as GME. Based on the detected GMV, the stage 35 is moved in XY directions, if possible, and correction is performed so that GMV is canceled out.

The drift is corrected before a fluorescent part is focused and a fluorescent image is captured. Thus, it is possible to capture a fluorescent image that represents independent movement of individual cells or only movement of the fluorescent part.

It should be noted that a marker (beads, etc.) can be used to detect drift with only a fluorescent image without a bright field image. In this case, it may be impossible to perform analysis appropriately in the ease where a marker appears in a fluorescent image and the marker overlaps a fluorescent part. Therefore, as in the embodiment of the present technology, it is favorable that a marker that appears in a fluorescent image is not used and a bright field image is used to detect drift.

It should be noted that in the case where a bright field image is used to detect drift a marker that appears in a bright field image but does not appear in a fluorescent image may be used.

(Countermeasures Against Individual Movement of Cells (Phosphor))

A difference (sum of absolute difference (SAD), etc.) between two fluorescent images is used to obtain movement (deviation) of an area (ROI area). An observer desires to observe the area. Then, a detection frame for autofocusing is moved in XY directions in accordance with the obtained movement (motion vector). Thus, it is possible to deal with the deviation of the ROI area.

(Countermeasure Against Deviation Caused Due to Temperature Change)

A relationship between a temperature and a displacement of the stage 35 in a Z direction at the temperature is measured, and the temperature/Z direction position change table 52*a* is created in advance. During actual observation, by measuring the temperature in the microscope 30 and referring to the temperature/Z direction position change table 52*a* based on the measured temperature, it is possible to appropriately determine the detection range in a Z direction when autofocusing is performed.

The overview of countermeasures against three types of deviation caused during long term observation such as time lapse observation has been described above.

(Entire Process)

Figure 2:
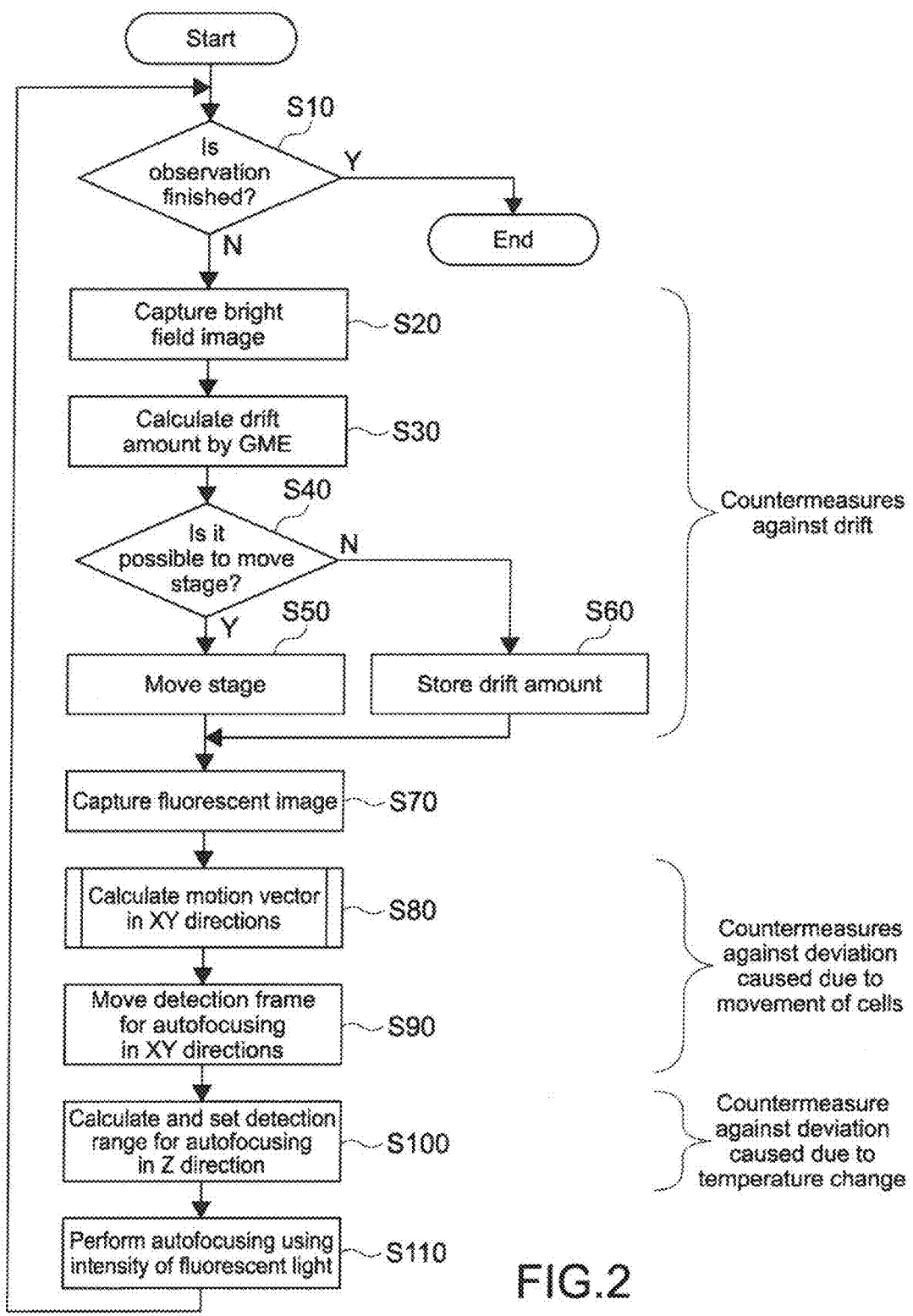
FIG. 2 is a flowchart for explaining the entire process in a flow of correction of deviation performed in a microscope system 1 according to this embodiment.

Next, the entire flow of a deviation correction process performed in the microscope system 1 according to this embodiment will be described. FIG. 2 is a flowchart for explaining the entire process in a flow of correction of deviation performed in a microscope system 1 according to this embodiment.

First the controller 51 of the system control PC 50 determines whether the observation is finished or not (Step 10).

In the case where observation is made (N in Step S10), the controller 51 repeats the following process until the observation is finished.

Next, the controller 51 instructs the microscope controller 40 or the like to capture a bright field image of a sample (Step S20). Its this case, autofocus is controlled so that not a phosphor but a cell is focused. It should be noted that a bright filed image is used here. However, it is not limited thereto, and a phase difference image, a differential interference image, or the like may be used.

Next, the controllers 51 calculates GMV from the obtained bright field image (time t being n, n being a positive real number) and a stored bright field image (time t being n−1) using a well-known method such as GME, and uses, the calculated GMV as a drift amount (Step S30).

Next, it is determined whether correction for the drift amount calculated in the previous step can be performed by moving the stage 35 or not (Step S40). It should be noted that whether the movement can be performed or not represents whether or not the stage 35 can be moved in a direction to cancel out the drift amount appropriately during the time from capturing to next capturing, in the case where the time to the next capturing is short, it is determined that the stage 35 is not able to be moved appropriately.

In the case where correction can be performed by moving the stage 35 (Y in Step S40), the controller 51 uses the stage driving unit 34 to move the stage 35 to the appropriate position in XY directions (Step S50).

In the case where the correction is not able to be performed by moving the stage 35 (N in Step S40), the controller 51 cause the storage unit 52 to store the drift amount so that the correction can be performed after observation (capturing) (Step S60).

Processes from Step S20 to this step are countermeasures against the drift.

Next, the controller 51 instructs the respective units in the microscope system 1 to capture a fluorescent image (Step S70). At this time, a phosphor is focused.

Next, the controller 51 uses the captured fluorescent image to calculate the motion vector (MY) in XY directions (Step S80). This process will be described later in detail.

Figure 3:
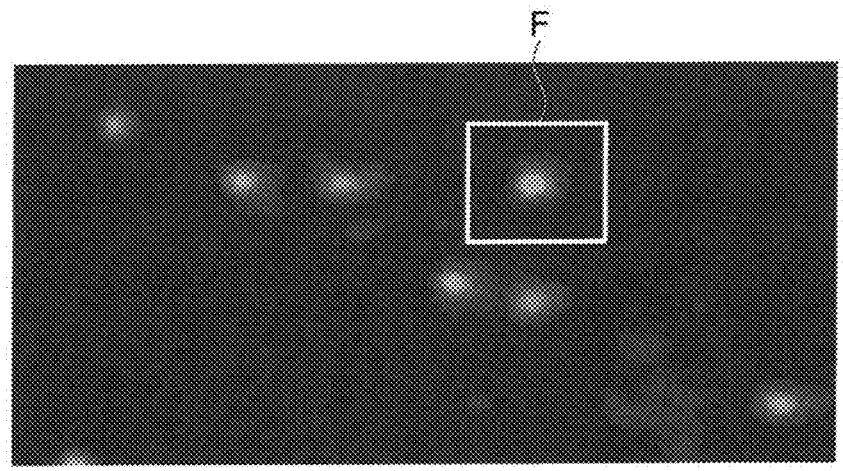
FIG. 3 is a diagram showing an example in which a detection frame F is appropriately set to a captured fluorescent image.

Next, the controller 51 moves the detection frame for autofocusing in XY directions based on the motion vector calculated in the previous step (Step S90). FIG. 3 is a diagram showing an example in which the detection frame F is appropriately set to a captured fluorescent image.

Processes from Step S80 to Step S90 are countermeasures against deviation from the detection frame caused due to individual movement of cells.

Next, the controller 51 measures the temperature in the microscope 30 by the temperature sensor 38. Then, the measured value is compared with the temperature/Z, direction position change table 52a to correct the deviation in a Z direction (Step S100). By the correction, the detection range for autofocusing in a Z direction is appropriately set. This step is a countermeasure against the deviation caused due to a temperature change.

Next, the controller 51 uses the appropriately-set detection frame (autofocusing target range in XY directions) and the detection range (autofocusing target range in a Z direction) to get a focus (Step S110). As the method of focusing, a well-known method may be used.

The entire flow of a deviation, correction process performed in the microscope system 1 according to this embodiment has been described above.

(Calculation of Motion Vector in XY Directions)

Figure 4:
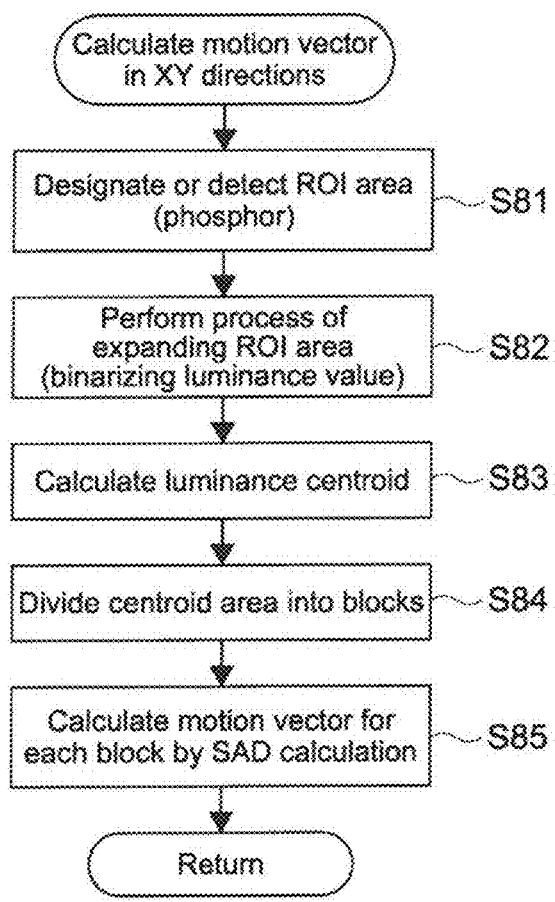
FIG. 4 is a flowchart for explaining calculation of a motion vector XY directions in detail.

Next, the calculation of a motion vector in XY directions described in the flow of the entire process will be described in detail. FIG. 4 is a flowchart for explaining the calculation of a motion vector in XY directions in detail.

Figure 5:
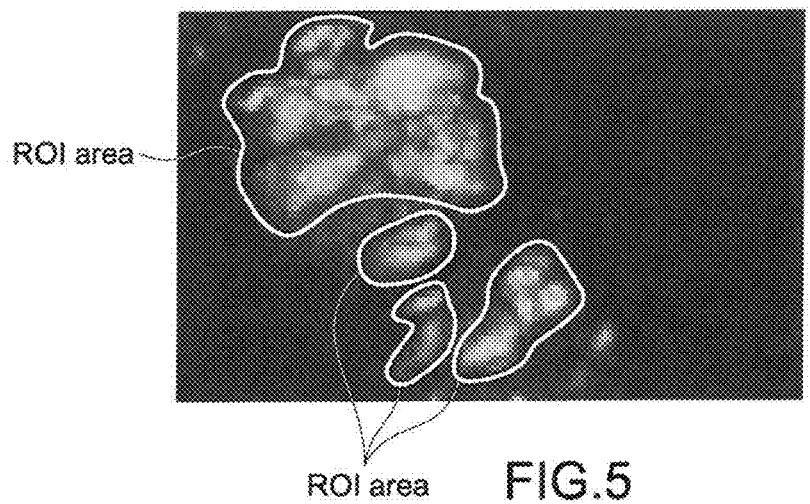
FIG. 5 is a diagram showing a state where a ROI area is obtained in a fluorescent image.

First, the controller 51 receives designation of a ROI area (area with a phosphor) from an observer, or detects a ROI area (Step S81). FIG. 5 is a diagram showing a state where a ROI area is obtained in a fluorescent image.

Figure 6:
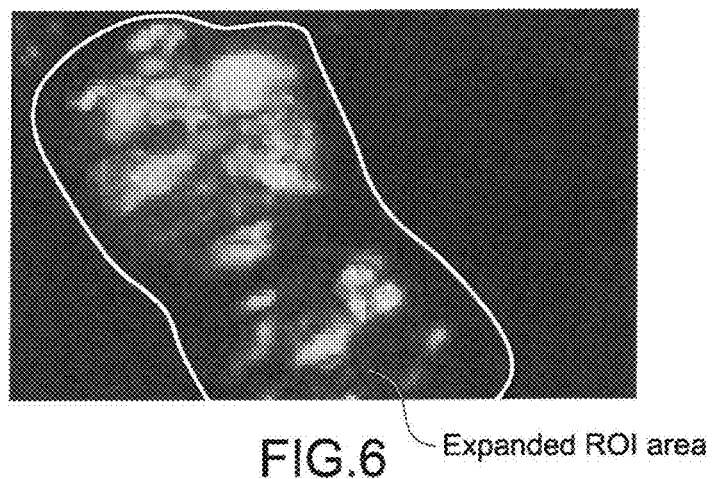
FIG. 6 is a diagram showing a state where a ROI area is expanded in a fluorescent image.

Next the controller 51 performs a process of expanding a ROI area (Step S82), FIG. 6 is a diagram showing a state where a ROI area is expanded in a fluorescent image. This process pan be performed by, for example, a process of binarizing a luminance value. Specifically, by setting a threshold value of the luminance value appropriately, it is possible to set an area with low luminance as a ROI area. Furthermore, in the ease where the expansion process is simplified, for example, a method of uniformly expanding a ROI area, which has not been expanded, with a predetermined width is conceivable. The process of expanding a ROI area is performed to deal with the temporal change of the shape of fluorescent light.

Next, the controller 51 calculates the luminance centroid of the expanded ROI area (Step S83). The luminance centroid is obtained using a luminance value of respective pixels, and represents the center of brightness. The luminance centroid is used because the position of the luminance centroid changes very little even if the shape of a phosphor changes with elapse of time. As the method of calculating the luminance centroid, a well-known method may be used. It is possible to use the luminance centroid as an index (marker) tracked to calculate the motion in XY directions.

Figure 7:
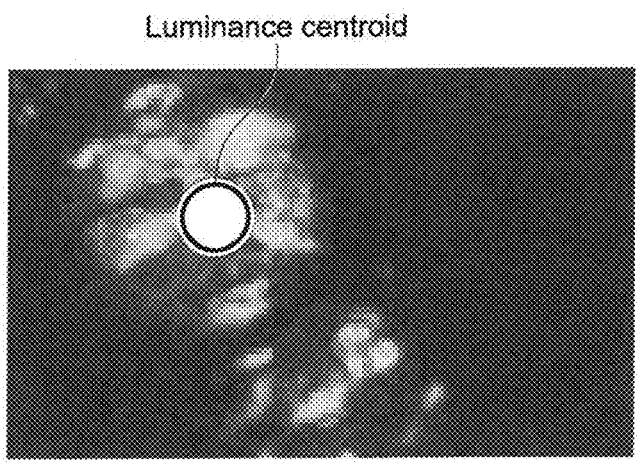
FIG. 7 is a diagram showing a state where a luminance centroid is obtained in a fluorescent image.

It should be noted that in the subsequent processes, an area that is expanded in Step S82 and includes the luminance centroid is referred to as a centroid area. FIG. 7 is a diagram showing a state where a luminance centroid is obtained in a fluorescent image. It should be noted that in FIG. 7, the luminance centroid is shown by a circle having the area for the sake of simplicity. The luminance centroid is actually a point.

Figure 8:
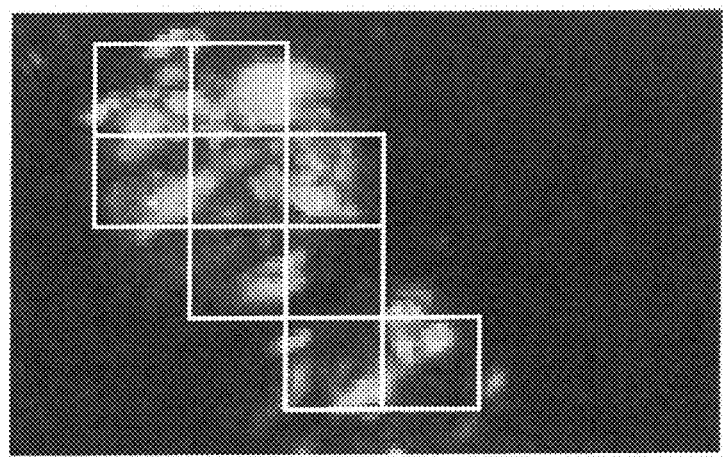
FIG. 8 is a diagram showing a state where a centroid area is divided into a plurality of blocks in a fluorescent image.

Next the controller 51 divides the centroid area into blocks (Step S84). The centroid area is divided into blocks so that the motion vector of a ROI area can be easily calculated. FIG. 8 is a diagram showing a state where a centroid area is divided into a plurality of blocks in a fluorescent image. It can be seen that almost ail fluorescent areas are covered by blocks. It should be noted that only one block may be provided at a position of the luminance centroid. A plurality of Mocks are used in the case where a phosphor is distributed widely with about the same luminance.

Figure 9:
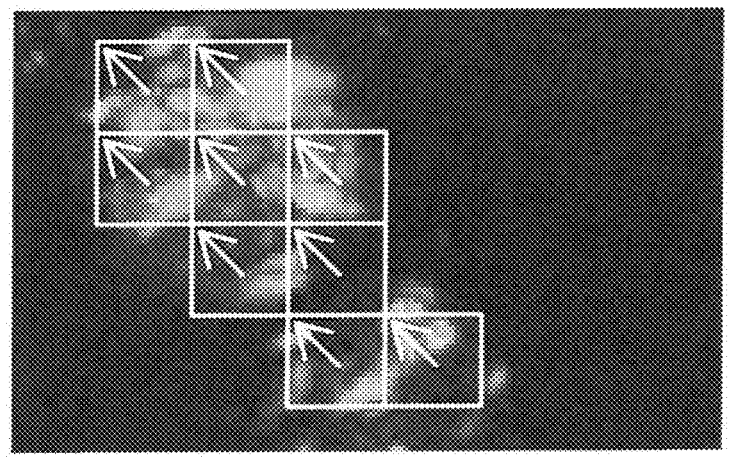
FIG. 9 is a diagram showing a state where a motion vector is calculated for each block in a fluorescent image.

Next, the controller 51 calculates a motion vector for each block by a well-known method such as SAD calculation (Step S85). FIG. 9 is a diagram showing a state where a motion vector is calculated for each block in a fluorescent image.

The detail of calculation of a motion vector in XY directions has been described above.

Modified Example 1

Figure 10:
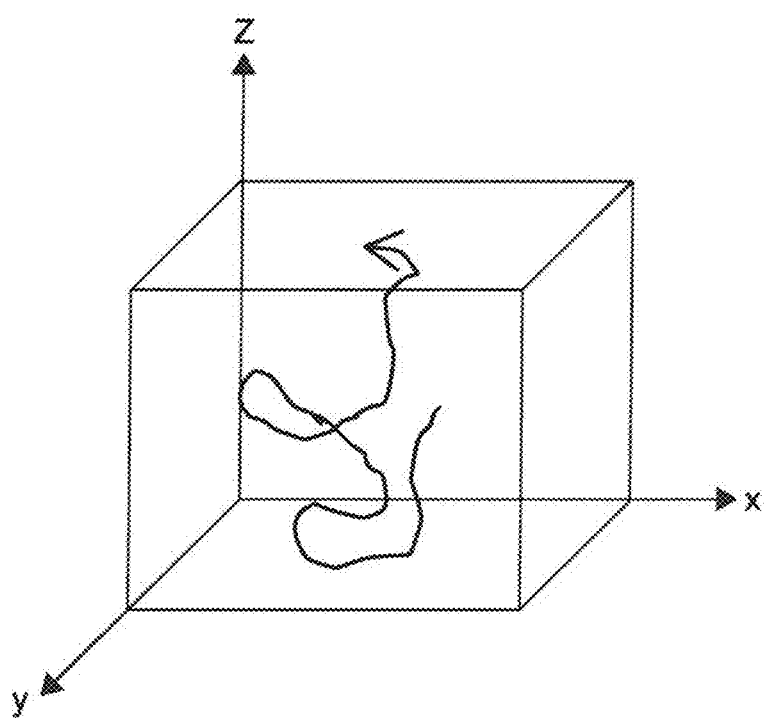
FIG. 10 is a diagram showing the locus of movement of a cell, which is obtained by connecting points obtained by plotting the position in XYZ directions for each time.

Now, a modified example of the configuration according to the first embodiment will be described. In the above-mentioned configuration, the stage 35 is moved in XY direction and Z direction in accordance with the movement of a cell (fluorescent light) to capture an image with time. On the other hand, in this modified example, the position of the stage 35 at the time when an image is captured is stored for each capturing. Then, the position for each time in XY directions and Z direction is plotted during analysis. Thus, it is possible to see how a cell, has moved in three-dimensional space, i.e., the locus of the cell. FIG. 10 is a diagram showing the locus of movement of a cell, which is obtained by connecting points obtained by plotting the position in XYZ directions for each time.

The first embodiment has been described above.

Second Embodiment

In the first embodiment, a technique to capture an auto-focused image by correcting various types of deviation caused when fluorescent images are captured with time has been described. Specifically, the technique according to the first embodiment has been made to capture an image appropriately. On the other hand, the technique described in the second embodiment has been made to reduce the burden on an analyzer during analysis after capturing.

It should be noted that in the configuration according to the first embodiment, the most-focused fluorescent image at a certain time in certain XY directions is captured. On the other hand, in the configuration according to this embodiment, fluorescent images at focal positions in a Z direction at a certain time in certain XY directions are captured. Specifically, also a defocused image is captured. Here, the set of images is referred to as "Z stack." The images have different focal positions in a Z direction.

The focal position in an image, which constitutes the Z stack, may be determined at predetermined intervals in the range from the upper surface of a glass slide to the lower surface of a cover glass, for example. A sample being a specimen is placed on the glass slide. The cover glass covers the sample.

(Configuration)

In this embodiment, captured images are analyzed and a commonly-used personal computer (PC) can be used. In a commonly-used PC, a fractional block that is realised by a program is the CPU of the PC is referred to as an analysis unit, here. The program performs the following analysis.

(Image of Three-Dimensional Tracking (Cell Tracking))

Figure 11:
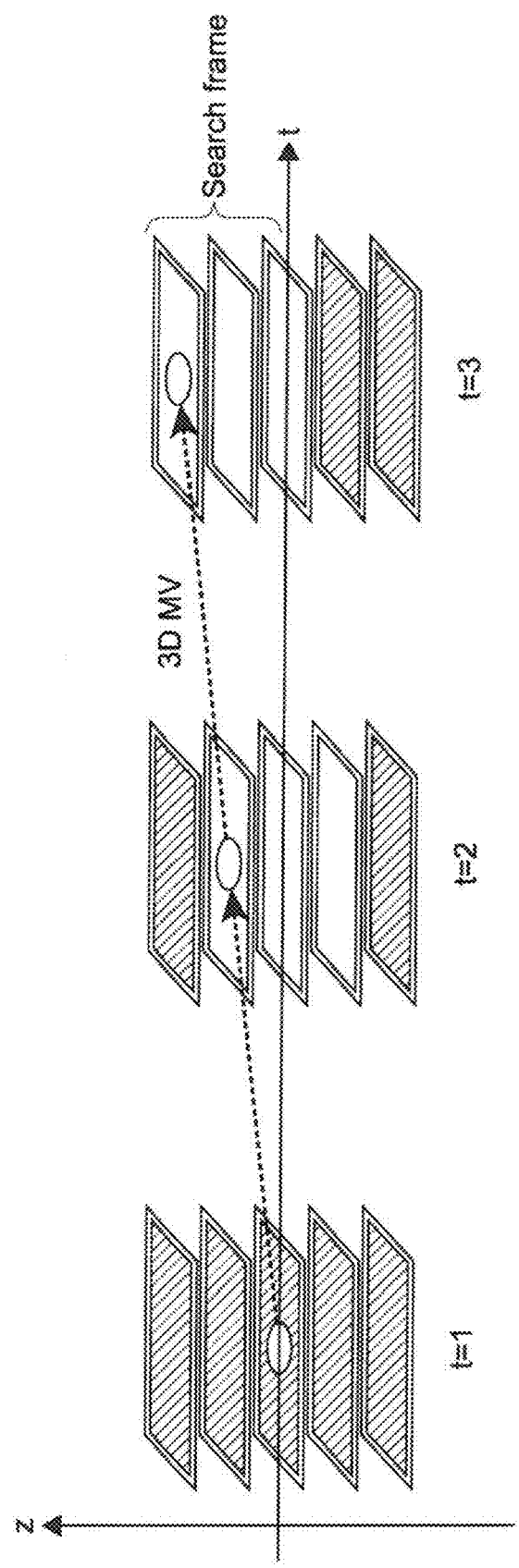
FIG. 11 is a schematic diagram for schematically explaining a method of tracking the movement of a cell using a Z stack at a plurality of times, and calculating the three-dimensional motion vector (3D MV) of the cell.

Now, a method of using a Z stack at a plurality of times to track movement of a cell and calculating a three-dimensional motion vector of the cell will be descried schematically. FIG. 11 is a schematic diagram for schematically explaining a method of tracking the movement of a cell using a Z stack at a plurality of times, and calculating the three-dimensional motion vector (3D MV) of the cell.

First, 5 fluorescent images having different focal positions in a Z direction are analyzed at a time t being 1. Here, it is assumed that fluorescent light from a cell, which is desired to be tracked, has been found in the third image from above. It should be noted that the cell may be designated by an analyzer or detected automatically.

Next, the analysis unit analyzes only three images, i.e., the third image at a position in a Z direction in which the cell that is desired to be tracked appears and two images adjacent thereto in the vertical direction, at the time t being 2. It should be noted that the three images are referred to as "search frame," and an area in which a motion vector is actually calculated is referred to as "search area." Regarding size, the size of the search frame is larger than the size of the search area. It should be noted that the search frame only needs to include a plurality of images, and the number of images is not limited to three. In FIG. 11, the search frame is shown by images with no diagonal line. By the analysis, it can be seen that the intended cell is moved to the second images from above at a position in a Z direction.

Next, three images, i.e., the second image from, above at a position in a Z direction and two images adjacent thereto in the vertical direction, are set as the search frame, and only the three images are analyzed, at the time t being 3. By the analysis, it can be seen that the intended cell is moved to the first image from above at a position in a Z direction.

Lastly, the three-dimensional motion vector (3D MV) is calculated based on the intended cell, being in the third image at a position in a Z direction at the time t being 1, in the second image at a position in a Z direction, at the time t being 2, and in the first image at a position in a Z direction at the time t being 3. For the calculation of the 3D MV, the 3D SAD calculation and 3D centroid calculation may be used.

As described above, in this embodiment, only images of the search frame including an image in which the intended cell is determined to appear at the time t being n−1 at a position in a Z direction and images adjacent thereto in the vertical direction are analyzed in the case where the Z stack at the time t being n is analyzed, excluding the time t being 1. Therefore, it is possible to perform analysis at higher speed than the method of analyzing all images of a Z stack.

Further, if the three-dimensional tracking can be performed, it is possible to observe a cell with time as if the movement of the cell is two-dimensional movement while maintaining the focused state of the intended cell.

It should be noted that in this embodiment, whether the cell identified at the time t being n−1 is the same as the cell found at the time t being n or not is determined in a comprehensive manner based on the luminance value of the cell, and the expansion and the standard deviation thereof. Specifically, cells have very similar shapes, and there are a lot of vectors having a high evaluated value (results of SAD calculation). In this regard, based on the information on the past motion vector of movement of a cell, an estimated movement rate of a cell is calculated and an appropriate vector is selected.

The method of using a Z stack at a plurality of times to track movement of a cell and calculating three-dimensional motion vector of the cell has been described schematically.

(Flow or Process)

Figure 12:
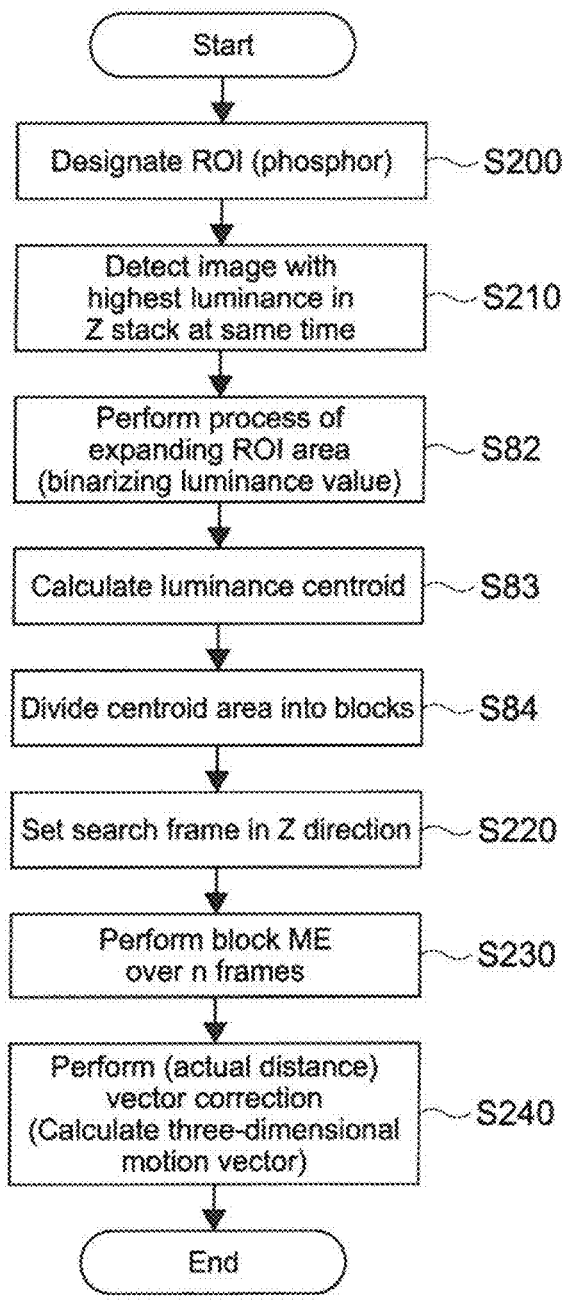
FIG. 12 is a flowchart for explaining a flow of an analyzing process in this embodiment.

Next, a flow of an analyzing process according to this embodiment will be described. FIG. 12 is a flowchart for explaining a flow of an analyzing process in this embodiment.

First, an analyzer designates a ROI area (area with a phosphor) in a fluorescent image included in the Z stack at the time t being 1 (Step S200).

Next, the analysis unit detects the image with the highest luminance in the Z stack at a same time (Step S210).

Next, the analysis unit performs a process of expanding a ROI area (Step S82). It should be noted that processes from Step S82 to Step S84 are the same as those according to the first embodiment.

Next, the analysis unit calculates the luminance centroid (Step S83).

Next, the analysis unit divides a centroid area into blocks (Step S84).

Next, the analysis unit, sets a search frame in a Z direction in a Z stack at the next time (Step S220).

During the whole time, the analysis unit performs block motion vector estimation (ME) on fluorescent images over n frames (specified during the whole time) after the position of the intended ROI area is identified (Step S230). By this process, it is possible to obtain a three-dimensional motion vector.

Lastly, the analysis unit performs actual distance correction on the three-dimensional motion vector calculated in the previous step (Step S240). It should be noted that the three-dimensional motion vector is corrected because an actual space distance between adjacent pixels changes due to the difference of the spatial resolution between an XY plane and a Z direction. In this step, it is possible to estimate the movement accurately by multiplying a weight coefficient based on the actual space distance by the three-dimensional motion vector to correct the motion vector. It should be noted that based on the motion vector corrected and calculated, it is possible to perform two-dimensional observation with time while focusing on a ROI area. In addition, as in the modified example of the first embodiment, it is possible to obtain the locus of movement of the ROI area in three-dimensional space. If the locus is obtained, the actual movement distance of the ROI area can be calculated.

It should be noted that the movement of a ROI area in an XY plane is detected, and is expanded three-dimensionally here. However, it is not limited thereto, and a method of detecting the movement of the ROI area on an XZ plane ox YZ plane depending on the resolution may be used.

Modified Example 2

Now, a modified example of the second embodiment will be descried, in the second embodiment, regarding the movement of a ROI area, the position in XY directions is identified first and expanded three-dimensionally to identity the position in a Z direction. On the other hand, in this modified example, the analysis unit identifies the three-dimensional position of the ROI area first, divides the ROI are into voxels being a regular grid unit in three-dimensional space, and analyzes the movement.

Figure 13:
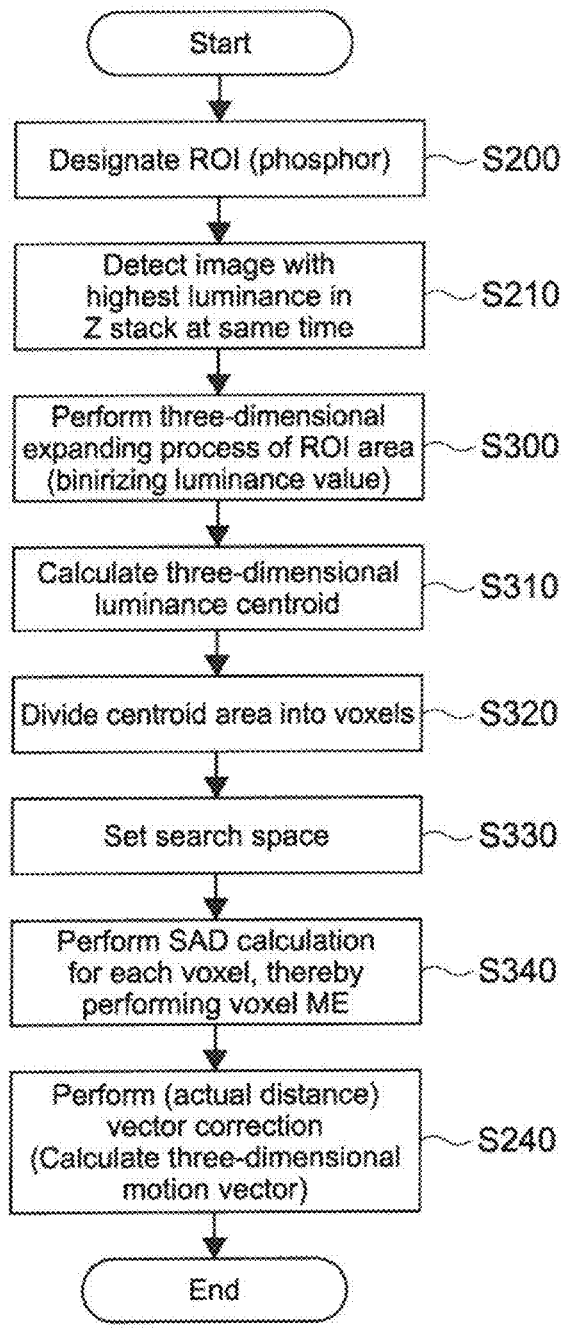
FIG. 13 is a flowchart for explaining a flow of an analyzing process in a modified example.

FIG. 13 is a flowchart for explaining a flow of an analyzing process in this modified example.

First an analyser designates a ROI area in a fluorescent image included in a Z stack at the time t being 1 (step S300).

Next, the analysis unit detects the image with the highest luminance in the Z stack at a same time (Step S210).

Next, the analysis unit performs a three-dimensional expanding process of the ROI area (binarizing luminance value) (Step S300).

Next the analysis unit calculates a three-dimensional luminance centroid (Step S310).

Next, the analysis unit divides the centroid area into voxels (Step S320).

Next, the analysis unit sets the search space in three-dimensional space at the next time (step S330).

Next, the analysis unit performs SAD calculation for each voxel, thereby performing voxel motion vector estimation (ME) (Step S340).

Lastly, the analysis unit performs actual distance correction on the motion vector, and calculates the three-dimensional motion vector (Step S240)

The modified example of the second embodiment has been described above.

(Supplementary Note)

Embodiments of the present technology are not limited to the above-mentioned embodiments and various modifications can be made without departing from the gist of the present technology.

(Other Configurations of Present Technology)

It should be noted that the present technology may also take the following configurations.

(1) A microscope system, comprising: a microscope; and a controller configured to control the microscope to: capture a first image of a sample, the first image being one of a bright field image, a phase difference image, and a differential interference image; and capture, based at least in pair on information obtained from the first image, a second image of the sample, the second image being a different type of image than the first image.

(2) The microscope system, of (1), wherein the second image is an image of fluorescence emitted by the sample.

(3) The microscope system of (1), wherein the first image is a bright field image.

(4) The microscope system of (1), wherein the second image is an image obtained by using a light source having a specified wavelength, and wherein the second image is not an image of fluorescence emitted by the sample.

(5) The microscope system of (1), wherein the controller is configured to control the microscope to capture the second image at least in part by: focusing the microscope, based at least in part on the information obtained from the first image, to capture the second image; and after the focusing, causing the microscope to capture the second image.

(6) The microscope system of (5), wherein the microscope comprises a movable stage, wherein the sample is disposed on the movable stage, and wherein focusing the microscope comprises: moving the movable stage by an amount determined based at least in part on the information obtained from the first image.

(7) The microscope system of (5) wherein focusing the microscope is performed based further on information obtained from one or more previously-captured images of a same type as the first image.

(8) The microscope system of (5), wherein focusing the microscope comprises calculating a general motion vector based at least in part on the information extracted from the first image.

(9) A method for use in connection with a microscope system, the microscope comprising a microscope, the method comprising: controlling the microscope to capture a first image of a sample, the first image being one of a bright field image, a phase difference image, and a differential interference image; and controlling the microscope to capture, based at least in part on information obtained from the first image, a second image of the sample, the second image being a different type of image than the first image.

(10) The method of (9), wherein the second image is an image of fluorescence emitted by the sample.

(11) The method of (9), wherein the first image is a bright field image.

(12) The method of (9), wherein controlling the microscope to capture the second image comprises: focusing the microscope, based at least in part on the information obtained from the first image, to capture the second image.

(13) The method of (12), wherein the microscope comprises a movable stage, wherein the sample is disposed on the movable stage, and wherein focusing the microscope comprises: moving the movable stage by an amount determined based at least in part on the information obtained from the first image.

(14) The method of (12), wherein focusing the microscope is performed based further on information obtained from one or more previously-captured images of a same type as the first image.
(15) The method of (12), wherein automatically focusing the microscope comprises calculating a general motion vector based at least in part m the information extracted from the first image.
(16) At least one non-transitory computer-readable storage medium storing processor-executable instructions that, when executed by a controller in a microscope system having a microscope, cause the controller to control the microscope to perform: capturing a first image of a sample, the first image being one of a bright field image, a phase difference image, and a differential interference image; and capturing, based at least in part on information obtained from the first image, a second image of the sample, the second image being a different type of image than the first image.
(17) The at least one non-transitory computer-readable storage medium of (16), wherein the second image is an image of fluorescence emitted by the sample.
(18) The at least one non-transitory computer-readable storage medium of (16), wherein the first image is a bright field image.
(19) The at least one non-transitory computer-readable storage medium off (16), wherein controlling the microscope to capture the second image comprises: focusing the microscope based at least in part on the information obtained from the first image and on information obtained from one or more previously-captured images of a same type as the first image.
(20) An imaging system, comprising: a controller configured to control the imaging system to: capture a first image of a sample, the first image being one of a bright field image, a phase difference image, and a differential interference image; and capture, based at least in part on information obtained from the first image, a second image of the sample, the second image being a different type of image than the first image.
(21) A microscope system including:
 a stage on which a fluorescence-stained biological sample is placed, the stage being movable;
 a bright field image capturing unit configured to capture a bright field image of the biological sample placed on the stage;
 a fluorescent image capturing unit configured to capture a fluorescent image of the biological sample placed on the stage; and
 a controller configured
  to cause the bright field image capturing unit to capture the bright field image at different times,
  to calculate movement between the bright field image currently captured and the bright field image captured at the previous time for each capturing of the bright field image,
  to move the stage so that the movement is canceled out, and
  to cause the fluorescent image capturing unit to capture the fluorescent image.
(22) The microscope system according to (21) above, in which
 the controller is configured to repeat the process including
  capturing the bright field image
  calculating the movement
  moving the stage, and
  capturing the fluorescent image.
(23) The microscope system according to (21) or (22) above, further including
 an objective lens used for the capturing, the controller being configured
  to set, as a detection frame, an area in an XY plane perpendicular to an optical axis of the objective lens used to search for a focal position of the objective lens,
  to set a region of interest (ROI) area in the fluorescent image,
  to calculate movement of the ROI area based on a plurality of fluorescent images captured sequentially, and
  to move the detection frame in the XY plane based on the movement of the ROI area.
(24) The microscope system according to any one of (21) to (23) above, further including:
 a temperature sensor configured to measure a temperature of the stage; and
 a storage unit configured to store information on a relationship between the temperature of the stage and distortion of the stage in the optical axis in advance, the controller being configured
  to obtain the temperature of the stage from the temperature sensor, and
  to refer to the relationship information to set a range of the optical axis for searching for the focal position based on the obtained temperature.
(25) The microscope system according to any one of (21) to (24), in which
 the controller is configured
  to calculate a time period necessary for moving the stage so that the movement between the bright field images is canceled out, and
  to cancel the movement of the stage and cause the storage unit to store the movement between the bright field images in a case where the calculated time period is longer than a time period for capturing the bright field image.
(26) An autofocusing method, including:
 capturing, by a bright field image capturing unit, a bright field image of a fluorescence-stained biological sample at different times, the biological sample being placed on a movable stage;
 calculating, by a controller, movement between the bright field images captured at respective times, and moving, by the controller, the stage so that the movement is canceled out; and
 capturing, by a fluorescent image capturing unit, a fluorescent image of the biological sample after the movement of the stage.

It should be understood by those skilled in the art that various modifications, combinations, sub-combinations and alterations may occur depending on design requirements and other factors insofar as they are within the scope of the appended claims or the equivalent thereof.

REFERENCE SIGNS LIST

1 Microscope system
10 Laser light source unit
11 Laser controller
20 Scanner unit
21 Scanner controller
22 Galvanometer mirror
23 Dichroic mirror
24 Light detector
30 Microscope 31 Filter
32 Objective lens
33 Sample
34 Stage driving unit
35 Stage
36 Imaging lens
37 Imaging unit
38 Temperature sensor
40 Microscope controller
50 System control PC
51 Controller
52 Storage unit
52a Temperature/Z direction position change table

The invention claimed is:

1. A microscope system, comprising:
a microscope; and
a controller configured to control the microscope to:
capture a plurality of first images of a sample,
wherein each of the plurality of first images is one of a bright field image, a phase difference image, or a differential interference image;
determine a time difference between a time of capture of a first image of the plurality of first images and a time of capture of a second image of the plurality of first images, wherein the second image of the plurality of first images is captured consecutive to capture of the first image of the plurality of first images;
determine whether an adjustment of a focus of the microscope is possible within the determined time difference;
adjust the focus of the microscope based on information extracted from the plurality of first images and the adjustment of the focus of the microscope that is possible within the determined time difference; and
capture a second image of the sample, based on the adjusted focus of the microscope,
wherein the second image is a different type of image than the captured plurality of first images.

2. The microscope system of claim 1, wherein the second image is an image of fluorescence emitted by the sample.

3. The microscope system of claim 1,
wherein the controller is further configured to control the microscope to capture the second image based on a light source that comprises a specified wavelength.

4. The microscope system of claim 1, further comprising:
a movable stage,
wherein the sample is on the movable stage, and
wherein the controller is further configured to:
determine a first amount corresponding to movement of the movable stage based on the extracted information from the plurality of first images, and
control the movement of the movable stage by the determined first amount.

5. The microscope system of claim 1, wherein controller is further configured to calculate a general motion vector corresponding to the plurality of first images, based on the extracted information.

6. A method, comprising:
in a microscope system including a microscope:
controlling the microscope to capture a plurality of first images of a sample,
wherein each of the plurality of first images is one of a bright field image, a phase difference image, or a differential interference image;
determining a time difference between a time of capture of a first image of the plurality of first images and a time of capture of a second image of the plurality of first images, wherein the second image of the plurality of first images is captured consecutive to capture of the first image of the plurality of first images;
determining whether an adjustment of a focus of the microscope is possible within the determined time difference;
adjusting the focus of the microscope based on information extracted from the plurality of first images and the adjustment of the focus of the microscope that is possible within the determined time difference; and
controlling the microscope to capture a second image of the sample, based on the adjusted focus of the microscope,
wherein the second image is a different type of image than the captured plurality of first images.

7. The method of claim 4, wherein the second image is an image of fluorescence emitted by the sample.

8. The method of claim 4,
wherein the microscope system comprises a movable stage,
wherein the sample is on the movable stage,
the method further comprising:
determining a first amount corresponding to movement of the movable stage based on the extracted information from the plurality of first images, and
moving the movable stage by the determined first amount.

9. The method of claim 4, further comprising:
calculating a general motion vector corresponding to the plurality of first images, based on the extracted information.

10. A non-transitory computer-readable medium having stored thereon, computer-executable instructions which, when executed by a controller in a microscope system having a microscope, cause the microscope system to execute operations, the operations comprising:
controlling the microscope to capture a plurality of first images of a sample,
wherein each of the plurality of first images is one of a bright field image, a phase difference image, or a differential interference image;
determining a time difference between a time of capture of a first image of the plurality of first images and a time of capture of a second image of the plurality of first images, wherein the second image of the plurality of first images is captured consecutive to capture of the first image of the plurality of first images;
determining whether an adjustment of a focus of the microscope is possible within the determined time difference;
adjusting the focus of the microscope based on information extracted from the plurality of first images and the adjustment of the focus of the microscope that is possible within the determined time difference; and
controlling the microscope to capture a second image of the sample, based on the adjusted focus of the microscope,
wherein the second image is a different type of image than the captured plurality of first images.

11. The non-transitory computer-readable medium of claim 10, wherein the second image is an image of fluorescence emitted by the sample.

12. An imaging system, comprising:
a memory configured to store a plurality of images; and
a controller configured to control the imaging system to:
capture a plurality of first images of a sample, wherein each of the plurality of first images is one of a bright field image, a phase difference image, or a differential interference image;
determine a time difference between a time of capture of a first image of the plurality of first images and a time of capture of a second image of the plurality of first images, wherein the second image of the plurality of first images is captured consecutive to capture of the first image of the plurality of first images;
determine whether an adjustment of a focus of a microscope is possible within the determined time difference;
capture a second image of the sample based on adjustment of the focus of the imaging system,
   wherein the focus of the imaging system is adjusted based on information extracted from the plurality of first images and the adjustment of the focus of the microscope that is possible within the determined time difference, and
   wherein the second image is a different type of image than the captured plurality of first images; and
control the memory to store the captured second image of the sample.

\* \* \* \* \*